May 31, 1966  B. G. TAYLOR  3,253,805
AIRCRAFT HAVING A SUBSTANTIALLY ANNULAR WING THEREON
Filed Jan. 27, 1964  4 Sheets-Sheet 1
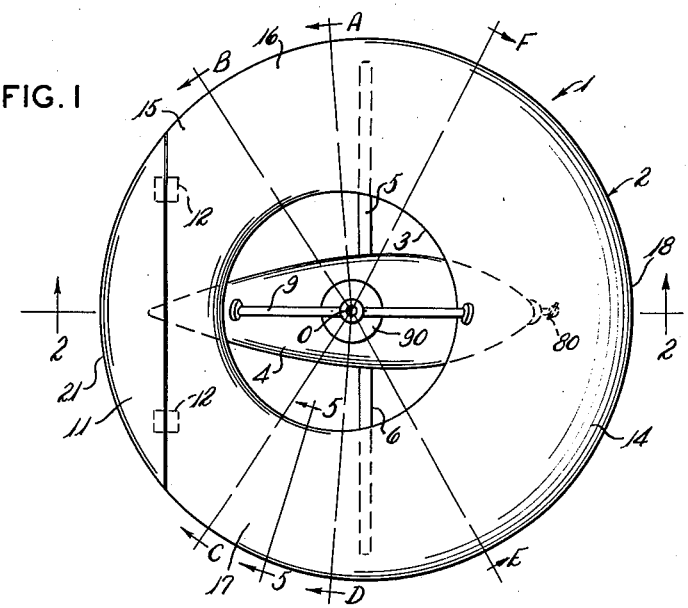
FIG. 1
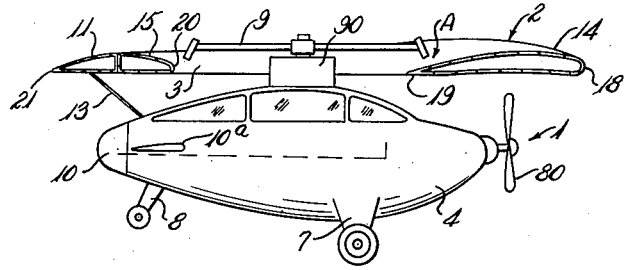
FIG. 2
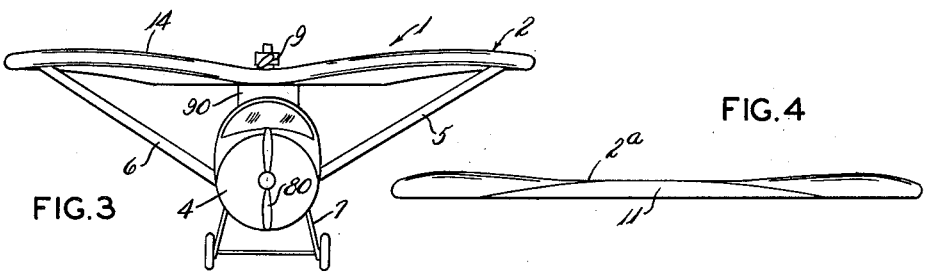
FIG. 3  FIG. 4
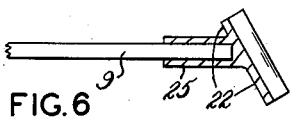
FIG. 6
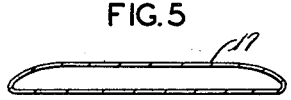
FIG. 5
*INVENTOR.*
BRUCE G. TAYLOR
BY Oldham & Oldham
ATTYS.

May 31, 1966     B. G. TAYLOR     3,253,805
AIRCRAFT HAVING A SUBSTANTIALLY ANNULAR WING THEREON
Filed Jan. 27, 1964     4 Sheets-Sheet 2

*INVENTOR.*
BRUCE G. TAYLOR
BY

ATTYS.

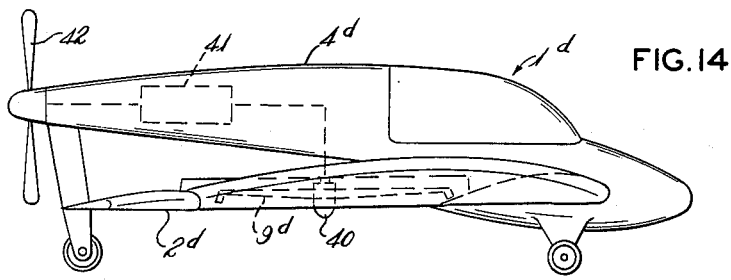
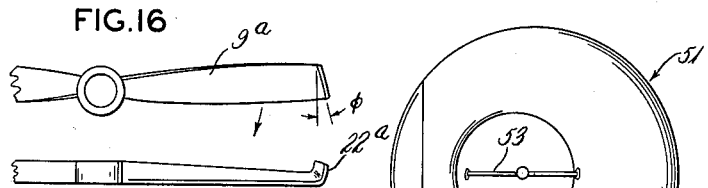
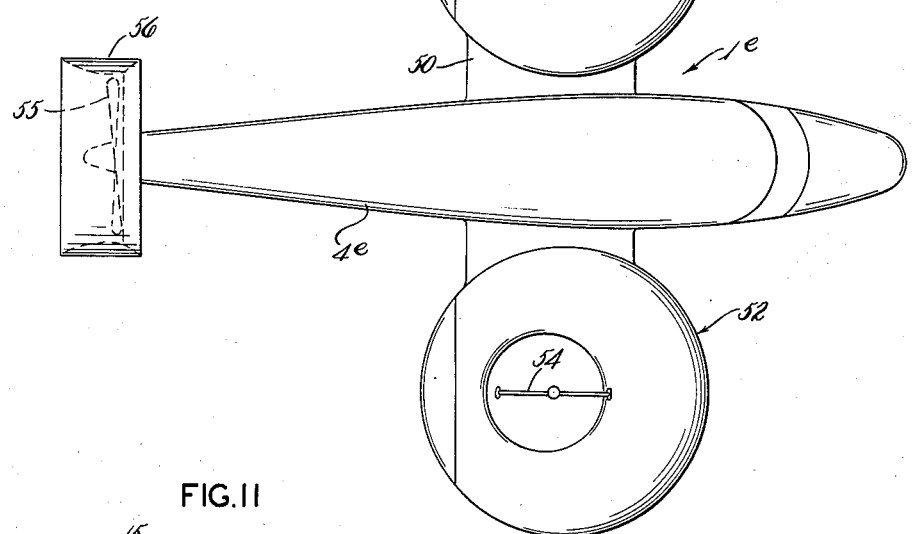
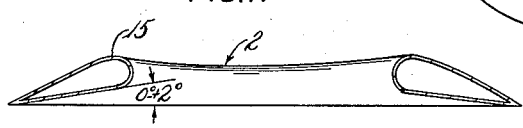
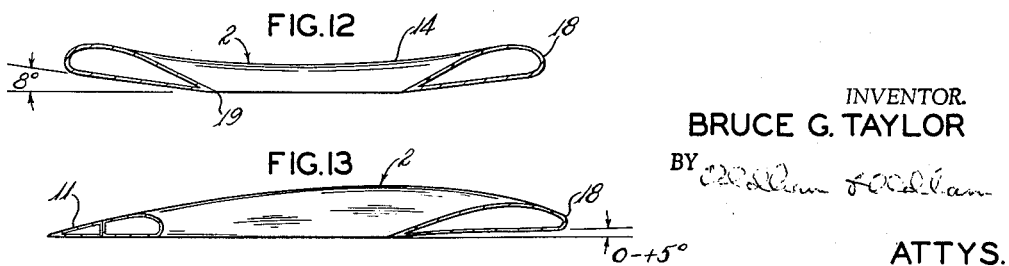
INVENTOR.
BRUCE G. TAYLOR
ATTYS.

May 31, 1966  B. G. TAYLOR  3,253,805
AIRCRAFT HAVING A SUBSTANTIALLY ANNULAR WING THEREON
Filed Jan. 27, 1964  4 Sheets-Sheet 4

INVENTOR.
BRUCE G. TAYLOR
BY
ATTYS.

United States Patent Office 3,253,805
Patented May 31, 1966

3,253,805
AIRCRAFT HAVING A SUBSTANTIALLY
ANNULAR WING THEREON
Bruce G. Taylor, 25925 Viana St., Lomita, Calif.
Filed Jan. 27, 1964, Ser. No. 340,567
21 Claims. (Cl. 244—12)

The present invention relates to aircraft having a wing or wings provided therein that extend arcuately and substantially horizontally of the airplane in relation to the longitudinal axis thereof, and especially to an aircraft that has an annular wing provided therein, which wing has some type of a centrally, or substantially centrally located opening provided therein.

The present invention relates to the same general styles of aircraft as are disclosed in my co-pending patent application Serial No. 617,951, filed October 24, 1956, now Patent No. 3,129,905, and to the general style of an aircraft as are shown in United States Letters Patents Nos. 2,876,964 and 2,547,266. Planes of the general type to which the present invention relates also are shown in my own prior Patent No. 3,055,613.

The present invention particularly relates to very short take-off and land planes, or to vertical lift aircraft, and to small lightweight planes of the general type of converta-planes. In these airplanes, the problems of a safe descent of the plane, should a power failure occur, are of major importance. Hence, any stability that can be built into the plane to aid in a "power off" descent of the plane is very desirable, as is any change that can be made to the aircraft design to render the plane less costly and complex to build.

The general object of the present invention is to provide a novel and improved aircraft characterized by the provision of an annular, or substantially annular wing therein and wherein the leading edge of the annular wing is reversed in position in relation to the opening provided in the wing at the trailing portion of the wing in relation to a normal conventional leading edge portion of the annular wing.

Another object of the invention is to provide a new and improved type of an aircraft including an annular wing therein and where a propeller having downwardly inclined tip portions formed thereon or secured thereto is positioned in a horizontal plane in direct association with the opening provided in the wing.

A further object of the invention is to provide an aircraft with a substantially annular type of a wing and with the rear arcuate portion of the wing being of substantially flat uniform shape in vertical section.

Yet other objects of the invention are to provide a novel and improved annular wing aircraft where the opening provided in the wing may either be concentrically or eccentrically placed with relation to the peripheral portion of the wing which may be either annular or substantially annular in shape, as desired; to provide an annular style of a wing which may lie in a horizontal plane, or which may have portions diverging slightly from a horizontal plane; to provide an annular style of an aircraft where the wing may be of different lengths at different radial portions thereof, and where leading edge portions for the plane wing are in different relative positions in the wing at different circumferentially spaced portions of the wing; to provide blend areas in a wing which are not of air foil shape but which connect by compound curvature to other portions of the wing of true air foil contour in vertical section; to provide any desired peripheral shape for a substantially annular type wing, to provide any desired center opening size and shape in the annular style wing; and to provide a novel and improved annular style wing having improved lift characteristics on power off descent, which wing can be used with any known or special types of propeller means located in any conventional, or special manners with relation to the aircraft wing.

The foregoing and other objects and advantages of the present invention will be more apparent as the specification proceeds.

Attention now is particularly directed to the accompanying drawings, where:

FIG. 1 is a plan view of an aircraft embodying the principles of the invention;

FIG. 2 is a side elevation, partially broken away and with the wing being shown in vertical section, of the aircraft of FIG. 1;

FIG. 3 is a front elevation of the aircraft of FIG. 1;

FIG. 4 is a rear elevation of a further modification of the annular wing means of the invention;

FIG. 5 is an enlarged vertical section taken on line 5—5 of FIG. 1;

FIG. 6 is an enlarged fragmentary elevation of the tip means provided on the propeller of FIG. 1;

FIG. 11 of the drawings is a vertical cross sectional view taken on line OB–OC of FIG. 1;

FIG. 12 is a vertical sectional view taken on lines OE and OF of FIG. 1 to show only the wing contour and with other portions of the wing being omitted for clarity;

FIG. 13 is a longitudinal vertical sectional view of the annular wing only of FIG. 1;

FIG. 14 is a side elevation of yet a further modified aircraft of the invention.

Figure 17:
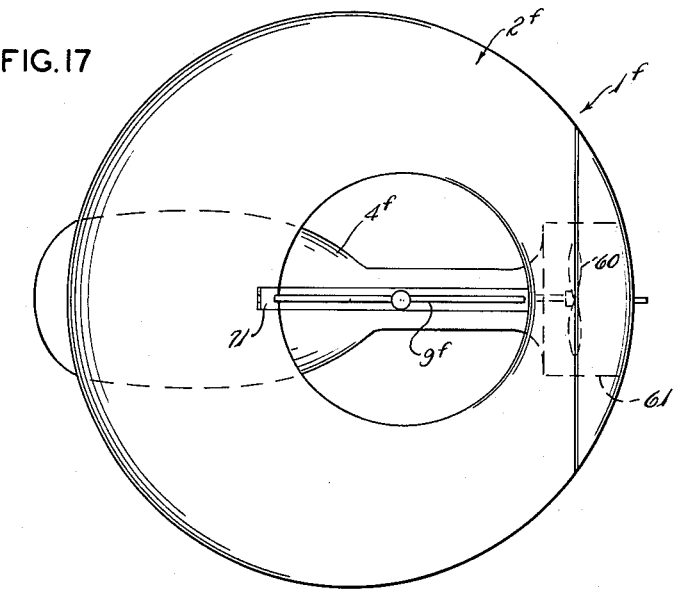
Figure 18:
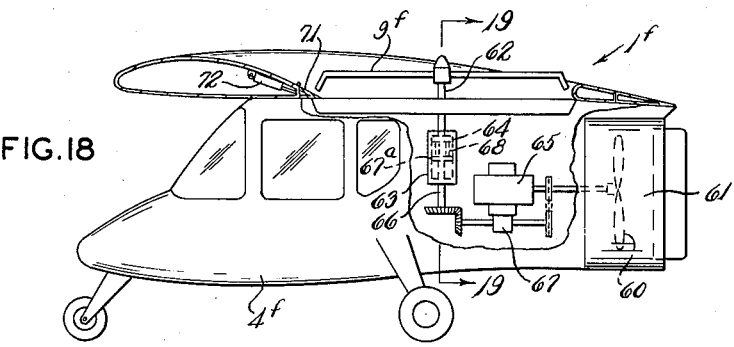
Figure 20:
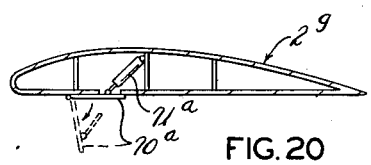
Figure 19:
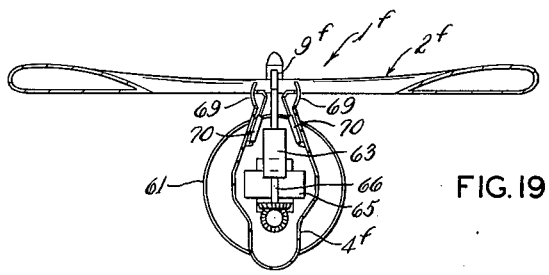

FIG. 15 is a plan view of a further modified embodiment of the invention utilizing two annular wing structures therein, and a pusher-type propeller drive for the aircraft;

FIG. 16 is a fragmentary inverted front elevation of a modification of the propeller of FIG. 6 and showing more propeller details;

FIG. 16a is a side elevation of the propeller of FIG. 16;

FIG. 17 is a plan of a further modified airplane of the invention;

FIG. 18 is a side elevation, partly broken away and partly shown in vertical section, of the airplane of FIG. 17;

FIG. 19 is a vertical section of the airplane taken on line 19—19 of FIG. 18; and FIG. 20 is a diagrammatic vertical section of a wing showing a spoiler means thereon as can be used on the aircraft wings of the invention.

When referring to corresponding members shown in the drawings, and referred to in the specification, corresponding numerals are used to facilitate comparison therebetween.

The present invention, generally speaking as to one embodiment thereof, relates to an aircraft comprising an annular wing with a center opening therein, a fuselage secured to the wing, and a driven propeller operatively secured to the fuselage, which aircraft includes the improvement of the annular wing having a forward section of about 180° in circumferential length and a rear section integral with the forward section and being of less than 180° in length, the forward section having a radially outer leading edge and a radially inner trailing edge extending the peripheral length thereof, and the rear section of the wing being of different vertical sectional shape than that of the forward section of the wing, which rear section connects to the circumferential margins of the forward section by varied vertically sectional shaped blend sections in the annular wing forming integral connecting portions between the margins of the said wing sections.

Attention now is particularly directed to the details of the structure shown in the drawings, and an aircraft 1 is shown. This aircraft 1 includes an annular type wing 2 which has an annular opening 3 provided therein around which the wing extends in at least substantially uniform or concentric relation thereto, but which opening is not necessarily on the center of the wing's radially outer edge.

The aircraft 1 also includes other conventional components, such as any suitable type of a fuselage 4 and is secured to the wing 2 as by support arms 5 and 6 attached to both the wing and the fuselage and extending therebetween, or else the wing may be directly secured against or to the fuselage. Any suitable landing gear means are provided for the fuselage 4 and may include a landing gear 7 of any known construction, and a tail support arm and wheel unit 8.

A propeller 9 is provided for the aircraft 1 and this propeller is suitably secured to any conventional drive means, such as a motor, indicated at 90, positioned in or carried by the fuselage 4, or, if desired, by the wing. In this embodiment of the invention, the propeller 9 is positioned in a horizontal plane and is generally parallel to but slightly above a substantially horizontal plane defined by the annular wing 2. This propeller 9 normally overlaps marginal portions of the opening 3, as indicated in FIG. 1, or it may overlap the entire radially inner edge of the wing.

The drawings also show that suitable members, such as a rudder 10 and stabilizer 10a, may be provided on the fuselage 4 while an elevator 11 is shown forming, in effect, a portion of the annular wing 2 but pivotally associated therewith, as by hinge means 12 connected therebetween. The elevator 11 is shown to be of a peripheral contour that blends smoothly in with the contour of the adjacent portions of the annular wing 2 when the stabilizer is so controlled as to be positioned in the plane defined by the annular wing 2. Suitable controls 13 extend from the elevator 11 to the fuselage 4 for control of the position of the elevator to aid in controlling flight operations and actions of the aircraft 1 by elevation or depression of this elevator, as is conventional in flying actions.

It is an important feature of the invention that the peripheral contour, and the sectional shapes and flight action of the annular wing 2 vary appreciably at different circumferentially spaced portions thereof. Thus the annular wing 2 is divided into a forward section 14 that is of about 180° in circumferential length, on its inner trailing edge or opening in relation to the imaginary or generally accepted center of such opening in such wing, and is generally defined by the arcuate portion at the forward or front end of the wing 2 between the lines OA and OD, as shown in FIG. 1. A rear section 15, integral with the forward section 14, is provided in the annular wing 2 and is of less than 180°, normally, in circumferential length, as measured from the imaginary or generally accepted center of the wing opening. This rear section 15 is connected to the forward section 14 by integral blend sections or merge sections or portions 16 and 17 provided in the annular wing 2. Such blend sections 16 and 17 are the wedge shaped portions of the annular wing 2, as generally are defined by and lie between the lines OA and OB, and between the lines OC and OD, respectively. The rear section 15 is that circumferential portion of the annular wing 2 lying between the lines OB and OC, as shown in FIG. 1, but it may be considered to include the blend sections 16 and 17. The drawing also clearly brings out the fact that the annular wing 2 is of substantially conventional air foil shape in vertical section at different portions thereof. Thus, FIG. 2 brings out the fact that the forward section 14 has a leading edge 18 formed at the radially outer margin of the annular wing, and with a trailing edge 19 being formed on the radially inner portion of the wing. The drawing clearly also shows that the leading edge 18 is relatively blunt in vertical height and tapers inwardly from a maximum vertical thickness radially intermediate the wing edges. The wing then tapers inwardly to the substantially feathered, or vertically narrow trailing edge 19, as shown in the drawings. This annular wing 2 in FIGS. 1 and 2 of the drawings is shown lying substantially in a horizontal plane, but this wing may be inclined vertically upwardly from the trailing edge in a direction towards the leading edge thereof so as to have an angle of attack, or incident in the wing in the flying characteristics of the wing.

It further will be seen from the drawings that the rear section 15 of the annular wing 2 is in effect the same in flying or lift action from that of the forward section. Thus, a leading edge 20 is shown on the radially inner portion of this rear section, and with a trailing edge 21 then being formed at the radially outer margin of this portion of the annular wing. By this reversal of position of the leading edge of the annular wing 2 at spaced circumferential portions thereof, improved operating characteristics and aerodynamic lifting action are obtained, all as described hereinafter in more detail. In order to connect the different contours of the wing sections together, the blend sections 16 and 17 of the annular wing are of complex curvature and of varied shape in vertical sections thereof taken on radii of the annular wing, while the forward section 14 is of varied angle of attack at different portions thereof, as hereinafter described. The rear section 15 may be of substantially the same general contour for the circumferential length thereof, and is of the same contour for at least the arcuate length of the elevator 11. The blend areas may have a typical contour, as shown at 17 in FIG. 5, at the central portion thereof but these connecting or blend areas in the annular wing are formed of suitable shapes to smoothly connect, or blend into the varied contour marginal portions of the forward and rear sections of the wing.

FIGS. 11 through 13 show further details of the sectional contour of the annular wing means of the aircraft 1, and FIGS. 12 and 13 particularly bring out the fact that the suggested maximum angle of attack of the leading or forward section of the annular wing 2 varies from approximately 0 degrees to up to 8 degrees, or more, at different portions in this leading section of the annular wing. The elevator 11 is suitably secured to the annular wing by conventional means (not shown) for both upward and downward movement. FIG. 12 shows the fact that at approximately 60 degrees from the center of the forward or leading edge portion of the annular wing 2, the maximum angle of attack of the wing is preferably about 8 degrees. The angle of attack at the meeting points of the blend section 16 with the leading edge wing section 14 has an angle of attack of about equal to or slightly smaller than the suggested highest angle of attack (about 8°) of the wing. The angle of attack of the trailing wing section 15, as shown in FIG. 11, is about +2° where it meets the blend area of the wing.

In general, it will be seen that the leading portion, or forward section of the annular wing 2 has a substantially blunt leading end thereon and it tapers smoothly by air foil contour to a tapered or feathered trailing edge.

FIG. 1 of the drawings also clearly shows that in this embodiment of the invention, the propeller 9 is eccentrically positioned with relation to the opening 3 in the annular wing, which opening 3 is of annular shape in this instance. The propeller 9 is positioned to be spaced forwardly from the leading edge 20 of the rear section of the wing, but to overlap the trailing edge 19 of the forward section 14, as shown. As maximum lifting action is obtained by the forward section 14, this section is shown of greater circumferential length than the rear section of the wing, while the radial length of the different portions of this leading section of the wing are also shown to be longer than similar portions in the rear section of the wing.

FIG. 3 shows that the forward section 14 of the wing is more or less of gull shape, or diverging angular shape. This dihedral angle provided in the leading portion of the wing 2 improves the flying characteristics of the plane in some instances.

FIG. 4 is a typical rear elevation, for example, of an annular wing 2a when positioned in a horizontal plane, as a modification of the embodiment of the invention shown in FIGS. 1 and 2 of the drawings.

FIG. 6 shows that the propeller 9 can have some propeller tips 22 suitably secured thereto and extending slightly from the ends thereof to create a boundary air flow action inwardly of the propeller. This propeller 9 may be of any suitable shape for creating air flow action, and the propeller tips 22 thereon are particularly useful in providing desired air flow action inwardly over the annular type wing 2. The propeller tips 22 are substantially of air foil shape from the leading edge of the trailing edge and the chord line of the tip lies at a positive angle of attack to the trailing edge. The tips 22 and the tips 22a of a propeller 9a are set at a positive angle of attack as indicated at the angle $\phi$ in FIG. 16. Any suitable means, such as cements, rivets, or the like, can extend through base flanges 25 of the propeller tip to secure it operatively on the margin of the propeller and hold it thereon for operative action, or the tips could be integral with the propeller by making the propeller and tips as a unitary forging.

Figure 7:
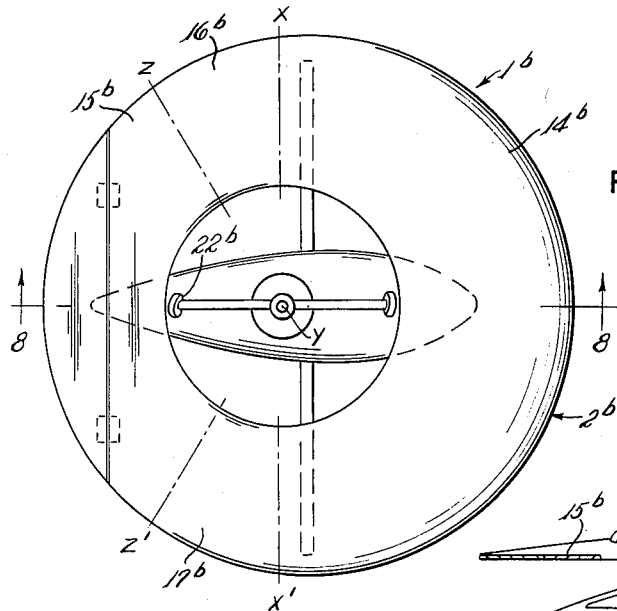
FIG. 7 is a top plan view of a further modified embodiment of the aircraft of the invention.
Figure 8:
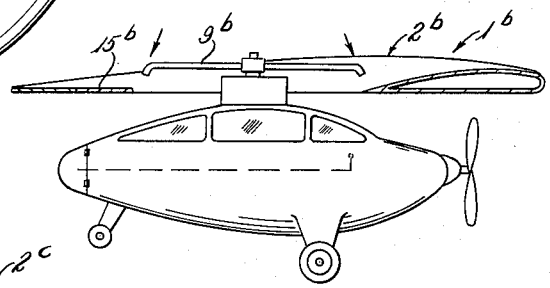
FIG. 8 is a side elevation of the aircraft shown in FIG. 7, with the annular wing being broken away and shown in vertical section.

FIGS. 7 and 8 of the drawings show a modified aircraft 1b of the invention. In this embodiment of the invention, an annular wing 2b is provided that has a forward section 14b and a rearward section 15b provided thereon. This forward section 14b is of substantially the same design as that of the aircraft shown in FIG. 1, but in this instance, the trailing section, or rear section 15b of the aircraft wing is of thin, flat contour in vertical section, as best shown in FIG. 8. It will be seen that the rear section 15b of the aircraft is that portion of the annular wing between the lines Y–Z$^1$ and Y–Z, as shown in FIG. 7. Again, blend or merge sections 16b and 17b are provided in the annular wing 2b and are integral therewith to form a connection therebetween and blend the wing sections smoothly into an integral unit. In this instance, the propeller 9b is positioned concentrically of the opening 3b of the wing, and any suitable types of propeller tips 22b can be provided thereon and secured thereto to cause an inward flow of air over the wing 2b.

Figure 9:
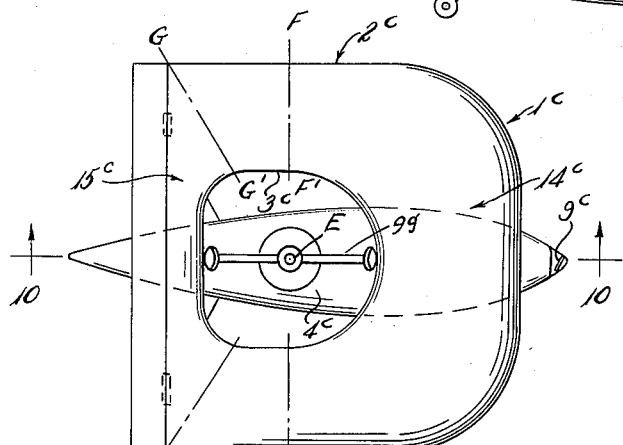
FIG. 9 is a top plan of yet a further modification of the annular wing type aircraft of the invention.
Figure 10:
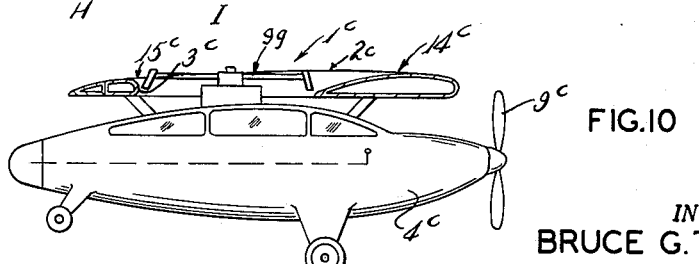
FIG. 10 is a longitudinal vertical section taken on line 10—10 of FIG. 9, but with the fuselage of the aircraft being shown in side elevation.

FIGS. 9 and 10 show yet another modification of the invention where an aircraft 1c is shown that has a substantially annular type wing 2c provided therein. In this instance, the opening 3c in the wing is eccentrically located with relation thereto and is of irregular, or non-circular shape. The forward section of this opening 3c, as indicated in general between the lines E–F and E–I, on FIG. 9, is of substantially arcuate shape and centered at the point E. However, the remainder of the opening 3c is of irregular form with substantially straight walls in the portions extending between the portions G$^1$–F$^1$ of the drawing, while the remaining or part of the opening 3c in a rear section 15c of the annular wing is of extremely flat arcuate curved shape. FIG. 9 of the drawings also best shows that the peripheral portion of the annular type wing 2c is of some deviation from a true annular form.

The annular wing 2c has a forward section 14c and a rear section 15c provided therein, and with these wings being of the reversed leading edge and trailing edge design, all as disclosed hereinbefore with relation to the structure shown in FIGS. 1 and 2. Again, any suitable stabilizer means can be associated with the annular wing, while any suitable elevators also can be built therein and form a portion thereof, as desired, and they may be adjustable for control by the pilot.

These stabilizers can be of any axial length as required in the plane, and the stabilizers again are suitably controlled by the pilot of the aircraft.

It is a feature of the aircraft shown in FIG. 9 that desirable flight characteristics are obtained therefrom even when a substantially conventional propeller 9c is provided operably on the forward, or rearward portion of the fuselage 4c and is driven in a conventional manner with, or without direct association with the annular wing 2c. In this variation of the invention a horizontally positioned propeller 9g can be adapted to be used in association with the annular wing 2c. These desirable flight characteristics include unusual spiral stability, inherent resistance to inverted flight, high lift characteristics for the wing when used without a horizontal propeller, and low stalling speed due to the slot effect created by the central opening in the wing.

With reference to FIG. 14, a further modified type of an aircraft 1d is shown that has an annular wing 2d. In this instance, the fuselage 4d is secured to the annular wing 2d adjacent the center line of the forward section of this wing. A horizontally positioned propeller 9d is indicated in the drawing and is suitably positioned on support means indicated diagrammatically at 40 that are carried by the fuselage 4d. A suitable motor 41 also is carried by the fuselage 4d and connects by conventional means (not shown) to either the propeller 9d, or to a pusher type propeller 42 carried by the tail portion of the fuselage 4d. This annular wing 2d is of the general type shown in FIG. 1.

In some instances it is desirable to provide two or more laterally spaced annular wings one on each side of an aircraft fuselage, and thus an aircraft 1e is shown in plan in FIG. 15. The aircraft 1e includes a fuselage 4e that has laterally extending supports 50 extending therefrom and which smoothly blend into and suitably support annular wings 51 and 52 that are of the general type of a construction shown in FIG. 1 and described in other portions of this specification. These annular wings 51 and 52 have propellers 53 and 54 positioned therein which propellers are normally located in horizontal planes and overlap the radially inner edges of the wings 53 and 54 in the same manner as the structure shown in FIG. 1. Any conventional drive means (not shown) may be provided in the fuselage 4e for this aircraft 1e and be connected in a conventional manner to the propellers for rotating and interlocking or interconnecting their drive means mechanically to insure symmetry of lift in case of partial power failure.

The aircraft 1e preferably has a jet or pusher type propeller 55 mounted thereon in a conventional manner within a duct 56 for propelling the aircraft 1e.

In the airplanes of the invention, any conventional, or ducted rudder means can be used in any of the forms of the aircraft of the invention disclosed. In some instances, such as in FIG. 15, the elevator shown can also be used as an aileron.

While the forward surface in the wings of the invention may be of arcuate shape in the preferred embodiment thereof, any forward surface shape, such as more of a rectangular shape, or otherwise, as desired, can be used, and see the examples of these wings in FIG. 9 of the drawings.

In the design of the aircraft of the invention, it is important that these annular wings be so constructed and made that the points of forward termination of the chord lines of the wings form a secondary air foil contour, which contour will have a lifting action when the aircraft is being prepared, or propelled by its primary drive motor, such as the motor and propeller 80 shown in FIG. 2. This secondary air foil contour extends from front to rear of the aircraft and would extend at least back to the points B and C of the aircraft wing shown in FIG. 1. Such a construction in the annular wing adds to the overall lifting action of the wing and particularly improves the spiral stability of the wing. Thus, more or less of a double usage of the wing is provided since this wing will give a good lifting and propelling action to the aircraft when the horizontally positioned propeller 9 in the aircraft of FIG. 1 is in use and draws air over and downwardly of the annular wing.

It is important to note that in the trailing edge of the wing section 14, it is normally positioned in a relatively flat plane which may be positioned upwardly or downwardly with relation to the trailing edge and/or leading edge of the forward wing section 14 of the aircraft. Also, it could be stated that in the wing shown in FIG. 9 the leading edge of the chord lines of this wing lie in a substantially flat plane.

In an aircraft 1f of FIG. 17, a fuselage 4f is shown that has a pusher type propeller 60 positioned in a duct 61 for aircraft propulsion. A horizontally positioned propeller 9f is positioned in the opening of an annular wing 2f that is similar to the wing 2 of FIG. 1. As a feature of this aircraft 1f, the propeller 9f is positioned on a drive shaft 62 which has a ram or control cylinder 63 operatively connected thereto for retracting the propeller 9f in to the fuselage 4f when the propeller is indexed therewith and is inoperative. Hence, when the aircraft is being propelled by the propeller 60, the propeller 9f can be stored to avoid any air flow interference in flight. The air cylinder 63 has a suitable controls (not shown) connected thereto to reciprocate a piston 64 positioned therein and attached to the drive shaft 62. Drive is provided to the piston 64 by a motor 65 suitably connected to a shaft 66 through a clutch and other conventional means 67. The shaft 66 drives a plate 67a within the cylinder 63 and is slidably connected, for example, to the piston 64 by a plurality of drive rods 68. A conventional clutch (not shown) may be present in the means connecting the motor 65 to the propeller 60.

An another element of the aircraft 1f, doors 69 may be pivotally secured to and form the upper portion of the fuselage below the propeller 9f. Control cylinders 70 are secured to the doors 69 to open them when the propeller 1f is suitably indexed therewith. A flap, or door section 71 is provided in a portion of the wing 2f when the propeller overlaps part of the wing. Hence, this door section can be opened by a control cylinder 72 to facilitate retraction of the propeller.

In some intances, a receiving recess only may be provided in the fuselage 4f for the propeller 9f. Some parts of the aircraft 1f are omitted in the drawings for clarity and simplification.

The aircraft of the invention may have spoilers 70a, as shown on a wing 2g in FIG. 20, provided thereon. A control cylinder 71a operatively connects to the spoiler to extend it for operative action, when desired. These spoilers 70a, or equivalents, can be provided on the other aircraft wings, such as the wing 2f in FIG. 17. The spoilers would be in balanced relation on opposite quadrants of the forward section of the wing.

It will be realized that the horizontally positioned propeller means provided in the aircraft of the invention provide maximum utility for aiding in vertical lift and descent actions of the aircraft, and that in many instances it is desirable to have other propeller or propulsion means provided in the aircraft to aid in propelling it forwardly.

From the foregoing, it will be seen that several different embodiments of the present annular wing aircraft have been provided, but that these aircraft in all instances have special annular wings provided thereon that have desirable lift and operating characteristics.

While the section lines OA, OB, OC, OD, OE and OF are shown taken from point O which is forward slightly from the actual center of the annular trailing edge 3, the sections preferably are taken from the actual center of the wing. For purposes of illustration, the small offset of point O from the trailing edge center does not materially change the sectional contour and therefor the sections shown represent the invention with the understanding that the sections are preferably measured from and taken at the actual, or generally accepted, center of the trailing edge of the wing.

It is particularly contended that the annular type wings shown in FIG. 1 and other drawings of the specification are particularly useful in increasing directional stability of the aircraft and in providing an improved lifting action in the aircraft. Both this stability and lifting action of the annular wing of the invention, when coupled with the horizontally positioned propeller to use in pulling air flow over the annular wing, aid materially in providing desirable characteristics in the aircraft.

By provision of the novel aircraft described, it is believed that the objects of the invention thus have been achieved.

While several complete embodiments of the invention have been disclosed herein, it will be appreciated that modifications of these particular embodiments of the invention may be resorted to without departing from the scope of the invention as defined in the appended claims.

What I claim is:

1. In an aircraft comprising an annular wing with a central opening therein, a fuselage fixedly secured to said wing and positioned therebelow, and a driven propeller operatively secured to said fuselage, the improvement comprising
    said annular wing having a forward section circumferentially spaced from a rearward section thereof but connected thereto by integral blend areas in the wing, said forward section having a substantially standard air foil shape and a leading edge formed thereon at the radially outer margin thereof and said rearward section having a substantially standard air foil shape and a leading edge formed on the radially inner margin thereof, and
    said propeller being positioned in a horizontal plane above and with its tips immediately adjacent at least a portion of said wing to draw air radially inwardly over said wing,
    said wing defining a plane which is substantially horizontal when the aircraft is in normal flight position.

2. In an aircraft comprising an annular wing with a central opening therein intermediate the margins thereof, a fuselage secured to said wing, and a driven propeller operatively secured to said fuselage, the improvement comprising
    said annular wing having a forward section circumferentially spaced from a rearward section thereof but connected thereto by integral blend areas in the wing, said forward section having a leading edge formed thereon at the radially outer margin thereof and said rearward section having a leading edge formed on the radially inner margin thereof, said forward section of said annular wing being of greater radial length in vertical section than said rearward section, said forward section being of over 180° in length, said forward and rearward sections being of air foil shape in vertical section.

3. In an aircraft comprising an annular wing with a substantially centrally positioned opening therein intermediate the margins thereof, a fuselage secured to said wing, and a driven propeller operatively secured to said fuselage for propelling the aircraft, the improvement comprising
    said annular wing having a forward section of about 180° in length and a rear section integral with said forward section and being of about 180° in length, said forward section of said annular wing having a radially outer leading edge and a radially inner trailing edge extending the peripheral length of said forward section, said leading edge being relatively blunt in vertical section and tapering inwardly from a maximum vertical thickness radially intermediate said edges to a subsantially feathered vertically narrow trailing edge, said rear section of said annular wing being of different but uniform vertical sectional shape at the circumferential center portion thereof than the sectional shape of said forward section and connecting the circumferential margins of said forward section to said rear section center portion by varied vertical sectionally shaped integral blend sections in said annular wing.

4. In an aircraft comprising an annular wing having a central opening therein, a fuselage secured to said wing, and drive means operatively secured to said fuselage for propelling the aircraft, the improvement comprising said annular wing having a forward section of about 180° in length and a rear section integral with said forward section and being of less than 180° in length, said forward section of said annular wing having a radially outer leading edge and a radially inner trailing edge extending the peripheral length thereof, said rear section of said annular wing being of different vertical sectional shape than the sectional shape of said forward section, said rear section connecting to the circumferential margins of said forward section by varied vertical sectionally shaped blend sections in said annular wing forming integral connecting portions between the margins of said sections.

5. An aircraft as in claim 4 where a propeller means is positioned in a substantially horizontal plane immediately above said wing opening, and tip means are operatively secured to said propeller means at the ends thereof and extend at an angle to the general horizontal plane of said propeller means, said tip means being of air foil contour in horizontal section and being positioned to overlap at least a portion of said annular-type wing when said propeller means are rotated, said tip means being positioned in a generally vertically extending plane at a positive angle of attack to aid in drawing air inwardly of said wing.

6. In an aircraft comprising an annular-type wing with a central opening therein around which the wing extends, a fuselage secured to said wing, and a driven propeller means operatively secured to said fuselage, the improvement comprising said opening in said wing being eccentrically positioned therein, said propeller means being positioned in a substantially horizontal plane immediately above said wing opening, and tip means operatively secured to said propeller means at the ends thereof and extending downwardly therefrom at an angle to the general horizontal plane of said propeller means, said tip means having a leading edge set at a positive angle of attack to the propeller axis to aid in drawing air inwardly over the upper surface of said wing, said tip means being positioned to overlap at least a portion of said annular-type wing when said propeller means are rotated.

7. In an aircraft comprising an annular-type wing with a central opening therein around which the wing extends, a fuselage secured to said wing and spaced therefrom, and a driven propeller means having a plurality of separate blades and operatively secured to said fuselage, the improvement comprising said propeller means being positioned in a substantially horizontal plane immediately above said wing opening, and a tip means formed as a unitary part of each separate blade of said propeller means at the ends thereof, said tip means having plane portions forming substantially a right angle with the horizontal plane of propeller rotation, and also forming an angle of somewhat greater than 90° with the longitudinal axis of each separate propeller blade so that upon rotation of the blades a downward thrust of air is obtained by the main body of each blade, and a radial inflow of air in the plane of propeller rotation is obtained by the tip means.

8. In an aircraft comprising an annular-type wing with a central opening therein around which the wing extends, said wing having forward and rear sections, a fuselage secured to said wing, and a driven propeller operatively secured to said fuselage, the improvement comprising said opening in said wing being eccentrically positioned therein, said opening being of arcuate shape in said forward section and being of other than arcuate shape in said rear section, said propeller being positioned in a plane immediately above said wing opening, said wing being radially longer in said forward section than in said rear section.

9. In an aircraft comprising an annular-type wing with an opening therein intermediate the margins thereof, a fuselage secured to said wing, and a driven propeller operatively secured to said fuselage, the improvement comprising said opening in said wing being eccentrically positioned therein, said propeller being positioned in a plane immediately above and eccentric of said wing opening, and tip means of air foil shape in horizontal section operatively secured to said propeller means at the ends thereof and extending at an angle to the horizontal plane thereof, said tip means having a positive angle of attack to move air over said wing and downwardly of said wing opening, said tip means being positioned to overlap at least a portion of said annular wing when said propeller is rotated.

10. An aircraft as in claim 4 where said central opening is eccentrically positioned with relation to the periphery of said wing, and where the said central opening is of irregular shape.

11. In an aircraft comprising an annular wing with a substantially centrally positioned opening therein intermediate the margins thereof, a fuselage secured to said wing, and a driven propeller operatively secured to said fuselage, the improvement comprising said propeller being substantially horizontally positioned on a vertical positioning axis adjacent, and above said annular wing; said propeller being substantially centered in the opening in said annular wing, said annular wing having a forward section circumferentially spaced from a rearward section thereof but connected thereto by integral blend areas in the wing, said forward section having a leading edge formed thereon at the radially outer margin thereof and said rearward section having a leading edge formed on the radially inner margin thereof, said forward section of said annular wing being of greater radial length in vertical section than said rearward section, said forward section being of about 180° in length, said forward and rearward sections being of air foil shape in vertical section.

12. In an aircraft comprising an annular-type wing with a central opening therein around which the wing extends, a fuselage secured to said wing, and a driven propeller means operatively secured to said fuselage, the improvement comprising said propeller means being positioned in a horizontal plane immediately above said wing opening, and tip means integral with said propeller means at the ends thereof and extending downwardly therefrom at an angle to the general horizontal plane of said propeller means, said tip means overlapping at least portions of the radially inner edge of said wing, and having sections with a leading edge at a positive angle of attack with relation to the circle of rotation thereof to draw air inwardly over the upper surface of said wing.

13. In an aircraft comprising an annular-type wing with a central opening therein around which the wing extends, a fuselage secured to said wing, and a driven propeller means operatively secured to said fuselage, the improvement comprising said opening in said wing being eccentrically positioned therein, said wing having the chord angles of the radial sections vary at different radial sections therein to create a varying perimeter to central opening contour but with all of such sections being of air foil shape, said propeller means being positioned in an approximate horizontal plane immediately above said wing opening, and tip means operatively secured to said propeller means at the ends thereof and extending downwardly therefrom at an angle to the general horizontal plane of said propeller means, said tip means overlapping at least portions of the radially inner edge of said wing, said tip means being of substantial air foil shape to lie in a plane at a positive angle of attack to the trailing edge to draw air inwardly over the upper surface of said wing.

14. In an aircraft comprising an annular-type wing with an opening therein around which the wing extends, the wing having forward and rearward sections, a fuselage secured to said wing, and a driven propeller means operatively secured to said fuselage, the improvement comprising said propeller means being positioned in a substantially horizontal plane within said wing opening, and tip means operatively secured to said propeller means at the ends thereof and extending downwardly therefrom at an angle to the general horizontal plane of said propeller means, said tip means being within said wing opening adjacent but spaced from the radially inner edge of said wing and having a leading edge at a positive angle of attack with relation to the circle of rotation thereof to aid in drawing air inwardly over the upper surface of said wing.

15. In an aircraft comprising an annular wing with a continuous opening therein intermediate the margins thereof, and a fuselage secured to said wing, the improvement comprising, said annular wing having a forward section circumferentially spaced from a rearward section thereof and connected thereto by integral blend areas in the wing, said forward section having a leading edge formed thereon at the radially outer margin thereof and said rearward section having a leading edge formed on the radially inner margin thereof, said forward section being divided into a center portion and two side portions, said forward section being of air foil shape in a radial direction with the angle of attack of said wing center portion being less than the angle of attack of most portions of said wing side portions.

16. In an aircraft comprising an annular wing with a continuous opening therein intermediate the margins thereof, lift propelling means in the opening and a fuselage secured to said wing, the improvement comprising said annular wing having a forward section circumferentially spaced from a rearward section thereof, said forward section having a smoothly curved relatively thick leading edge formed thereon at the radially outer margin thereof and said rearward section having a smoothly curved relatively thick leading edge formed on the radially inner margin thereof, said forward section having a feathered, vertically narrow trailing edge at the radially inner margin thereof, said rearward section having a feathered, vertically narrow trailing edge at the radially outer margin thereof, the radially outer margin of the annular wing gradually changing from the smoothly curved, relatively thick shape to the vertically narrow and feathered edge from the forward to the rearward sections, and the radially inner margin of the annular wing gradually changing from the vertically narrow feathered edge to the smoothly curved, relatively thick shape from the forward to the rearward sections.

17. In an aircraft comprising an annular wing with a central opening therein, and a driven propeller operatively secured to said wing, the improvement comprising said annular wing having a forward section circumferentially spaced from a rearward section thereof but connected thereto by integral blend areas in the wing, said forward section having a substantially standard air foil shape and a leading edge formed thereon at the radially outer margin thereof and said rearward section having a substantially standard air foil shape and a leading edge formed on the radially inner margin thereof, and said propeller being positioned in a substantially horizontal plane above and with its tips immediately adjacent at least a portion of said wing to draw air radially inwardly over said wing, said wing defining a plane which is substantially horizontal when the aircraft is in normal flight position.

18. An aircraft as in claim 1 where a second driven propeller is operatively secured to said fuselage, and means operatively position said first driven propeller for motion along its drive axis to move it into said fuselage when said first driven propeller is inoperative and indexed with said fuselage.

19. An aircraft as in claim 16 where at least two of said annular-type wings are provided and are secured to said fuselage on opposite sides thereof, said aircraft also having a forward propelling means operatively secured thereto.

20. In an aircraft comprising a fuselage, and an annular-type wing with a continuous opening therein intermediate the margins thereof, and a driven propeller operatively secured to said fuselage, the improvement comprising said annular-type wing having a forward section circumferentially spaced from a rearward section thereof and connected thereto by integral blend areas in the wing, said forward section having a leading edge formed thereon at the radially outer margin thereof and said rearward section having a different shape than said forward section, and wherein said rearward section is of thin horizontally flat shape in section for the major portion of the radially outer circumferential length thereof.

21. An aircraft as in claim 11 where said propeller overlaps all of the radially inner edge of said annular wing, said propeller being substantially centered in the opening in said annular wing.

References Cited by the Examiner

UNITED STATES PATENTS

| | | | |
|---|---|---|---|
| 2,461,435 | 2/1949 | Neumann | 244—12 |
| 2,635,833 | 4/1953 | Rzepela | 244—12 |
| 2,952,423 | 9/1960 | Ellis | 244—12 |

MILTON BUCHLER, *Primary Examiner.*

R. DAVID BLAKESLEE, FERGUS S. MIDDLETON,
*Examiners.*

L. C. HALL, G. P. EDGELL, *Assistant Examiners.*